United States Patent [19]
Rossetti et al.

[11] Patent Number: 5,152,967
[45] Date of Patent: Oct. 6, 1992

[54] INTERZONE MIXING DEVICE

[75] Inventors: Salvatore J. Rossetti, Bernardsville; John T. Wyatt, Florham Park; Robert M. Koros, Westfield, all of N.J.

[73] Assignee: Exxon Research and Engineering Company, Florham Park, N.J.

[21] Appl. No.: 539,397

[22] Filed: Jun. 18, 1990

Related U.S. Application Data

[63] Continuation-in-part of Ser. No. 284,050, Dec. 14, 1988, Pat. No. 4,960,571.

[51] Int. Cl.$^5$ ............................................... B01J 8/04
[52] U.S. Cl. ..................... 422/194; 422/191; 422/195; 422/220; 422/224; 366/336; 366/337; 366/338; 366/340; 261/114.1; 261/114.2; 261/114.3; 239/543
[58] Field of Search .............. 422/191, 194, 195, 220, 422/224; 366/336, 337, 338, 340; 261/114.1, 114.2, 114.3; 239/543, 555, 557, 560, 559, 566, 567

[56] References Cited

U.S. PATENT DOCUMENTS

| | | | |
|---|---|---|---|
| 3,556,736 | 12/1968 | Boyd | 422/194 |
| 3,697,416 | 10/1972 | Carson et al. | 422/191 |
| 3,705,016 | 12/1972 | Ludwigsen et al. | 422/194 |
| 4,235,847 | 11/1980 | Scott | 422/195 |
| 4,669,890 | 6/1987 | Peyrot | 422/191 |
| 4,836,989 | 6/1989 | Aly et al. | 422/195 |
| 4,960,571 | 10/1990 | Bhagat et al. | 422/194 |

Primary Examiner—Robert J. Warden
Assistant Examiner—Laura E. Collins
Attorney, Agent, or Firm—Joseph J. Dvorak

[57] ABSTRACT

The interzone mixing device of the present invention is positioned in a multi-zoned vessel for flow of fluid generally vertically therethrough. The interzone mixing device includes a horizontally disposed first plate that has a central opening in it and a cylindrical cap extending upwardly from the first plate and sized and positioned to cover the central opening therein. The cap has a plurality of angular slots in the side wall to direct the flow of fluid passing therethrough in a swirling direction toward the central opening in the first plate. The interzone mixing device also includes a horizontally disposed second plate which has a plurality of openings in an annular ring around the periphery of the second plate. Additionally, a horizontally disposed circular table is positioned on the second plate and is aligned with the central opening in the first plate. A third horizontally disposed plate, having a central opening therein, is spaced apart from the second plate and defines a jet stirred mixing zone therebetween. A horizontally disposed fluid distribution plate is spaced apart from the third plate. A conduit for introducing a quench fluid is also provided in this apparatus.

7 Claims, 3 Drawing Sheets

INTERZONE MIXING DEVICE

CROSS REFERENCE TO RELATED APPLICATIONS

This application is a continuation-in-part of U.S. application Ser. No. 284,050, filed Dec. 14, 1988.

The present invention relates to a quench assembly suitable for efficiently premixing fluids of different temperatures or composition. In particular, the present invention is suitable for thoroughly mixing a minor amount of fluid with a major amount of fluid in a relatively short mixing zone.

BACKGROUND OF THE INVENTION

Many catalytic processes are carried out in reactors which contain a series of separated catalytic beds. In such processes frequently mixing means, such as quench boxes, are disposed between beds. The purpose of the quench boxes is to provide rapid and efficient mixing of the fluid steams being processed in the reactor with a cooler fluid stream supplied from an external source thereby controlling the temperature of the process stream coming into contact with the catalyst in the next succeeding catalyst bed. As will be readily appreciated, the better the mixing, the better the temperature and reaction control and, hence, the better the overall reactor performance.

Examples of interzone mixing devices can be found in U.S. Pat. No. 3,143,581, U.S. Pat. No. 3,480,407, U.S. Pat. No. 3,502,445, U.S. Pat. No. 3,705,016, U.S. Pat. No. 3,723,072, U.S. Pat. No. 3,880,961, U.S. Pat. No. 3,895,919, U.S. Pat. No. 4,235,847 and U.S. Pat. No. 4,836,989. Some of these devices are complicated. Some are prone to plugging. Some really need a relatively large space to provide the desirable degree of mixing.

In copending application Ser. No. 284,050 filed Dec. 14, 1988, now U.S. Pat. No. 4,960,571 there is described a quench assembly that provides a significant improvement over known quench boxes. Notwithstanding, the improvements achieved by that device, in today's competitive processing industry there is a need to constantly seek further improvement. It is, therefore, an object of the present invention to provide a device for thoroughly mixing in the space between two reaction zones, a stream of fluid supplied from an external source with the main process stream fluid.

It is also an object of the present invention to provide a device for efficiently mixing a relatively minor amount of fluid with a relatively major amount of fluid, especially in an interzone space. These and other objects are achieved by the novel device herein described and claimed.

SUMMARY OF THE INVENTION

The fluid mixing device of the present invention comprises: a vertically disposed vessel having a fluid inlet means and a fluid outlet means permitting the flow of fluid generally vertically through the vessel; a horizontally disposed first plate having a first surface, a second surface and a central opening in the plate; a cylindrical cap having a vertical side wall extending vertically from the first surface of the first plate, sized and positioned to cover the central opening in the first plate, the cap having a plurality of angular slots in the side wall to direct the flow of fluid passing therethrough in a swirling direction toward the central opening in the first plate; a horizontally disposed second plate having a first surface, a second surface and a plurality of openings in an annular ring around the periphery of the second plate, the first surface of the second plate facing but spaced apart from the second surface of the first plate. A horizontally disposed circular table is positioned on the first surface of the second plate and axially aligned with the central opening in the first plate. A plurality of conduits extend vertically from the second surface of the second plate and communicate with the peripheral openings therein, the conduits having slots therein oriented at predetermined angle with respect to the radius of the vessel. A third horizontally disposed plate, having a central opening therein, is spaced apart from the second surface of the second plate and defines a jet stirred mixing zone there between. A horizontally disposed fluid distribution plate is spaced apart from the third plate and has a plurality of openings therein whereby fluids contacting the plate are distributed by flowing through the openings therein. Means for introducing a fluid stream, from an external source, to the vessel on the first surface side of the first plate is also provided.

This and other features of the present invention will be more readily understood upon a reading of the "Detailed Description" in conjunction with the accompanying drawings.

DETAILED DESCRIPTION OF THE PRESENT INVENTION

The invention will now be described with reference to its use in a multi-bed, catalytic reactor in which the mixing device is located in the zone between two catalytic beds. The mixing device of the present invention, of course, can be used in non-catalytic vessels or reactors if so desired.

Figure 1:
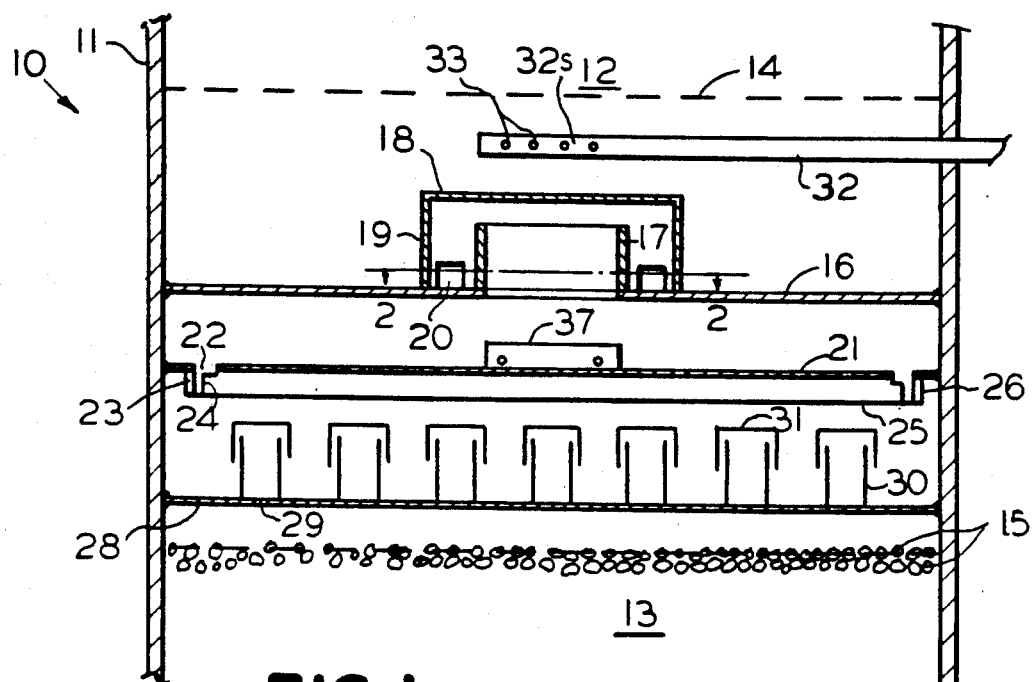
FIG. 1 is a vertical sectional view of a downflow vertical containing at least two catalyst beds and having an interzone mixing device in accordance with the present invention.

Referring now to FIG. 1 of the drawings, reference number 10 generally indicates a fluid down-flow, multi-bed catalytic reactor or vessel having a vertical cylindrical sidewall 11 enclosing a plurality of beds of catalyst. The vessel 10, therefore, has an upper fluid inlet (not shown) and a lower fluid outlet (also not shown) for introducing a fluid stream for downward flow through the vessel and ultimate removal of the stream after its passage through the vessel.

Shown in FIG. 1 are catalyst beds 12 and 13. The bed 12 of the catalyst is supported by a catalyst bed support 14 such as a perforated plate, a grid covered with screening or the like, which permits fluid to exit the bottom of the bed. As is known in the art, a plurality of ceramic balls, Raschig rings or the like are disposed on top of the catalyst beds to aid in the distribution of gases as they enter the bed and also to prevent catalyst particles from being disturbed from the position in which they were placed when the vessel was loaded with catalyst. In the FIG. 1 embodiment, ceramic balls 15 are shown on the top of catalyst bed 13. Thus, each of the multiple catalyst beds within the vessel comprise catalyst particles, a lower support layer and a covering layer.

Interposed between successive catalyst beds 12 and 13 is a mixing device for introducing and mixing a secondary fluid, from an external source, with the partially reacted process fluid exiting from the catalyst bed 12 above the mixing device. The secondary fluid typically is a quench fluid that has a lower temperature than the process stream and is introduced to control the temperature of the process fluid as it enters the next catalyst bed. The secondary fluid may also be added for adjusting the composition of the process stream prior to its entry into the next catalyst bed.

As shown in FIG. 1 the mixing device includes a horizontally disposed first plate 16 that extends across the vessel 10 and is secured by any convenient manner. First plate 16, as shown, has a central opening through which the fluids may flow as they progress through the vessel 10. Also, plate 16 is located below and spaced apart from the catalyst support 14. The size of the central opening in plate 16 will depend upon the allowable pressure drop across plate 16. As a general guide, the open area in plate 16 will be in the range of from about 1 percent to about 15 percent of the cross-sectional area of the vessel 10.

Figure 2:
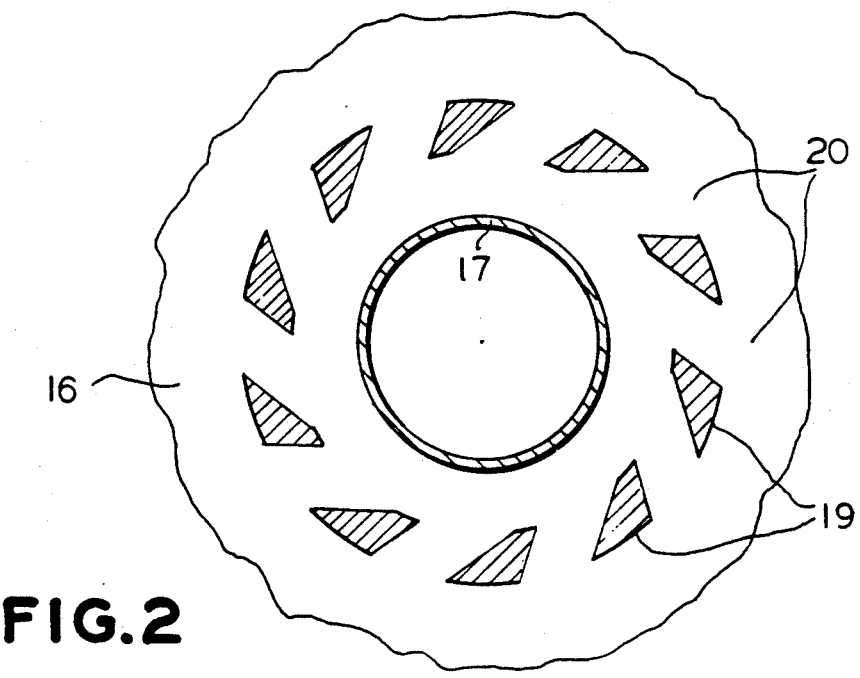
FIG. 2 is a sectional view, taken along lines 2—2 of FIG. 1 showing the slotted openings in the cylindrical cap of the interzone mixing device of this invention.

A cylindrical cap 18 with sidewalls 19 extends upwardly from first plate 16 and is positioned to cover the central opening in plate 16. Thus, cap 18 has a diameter greater than the diameter of the central opening in plate 16. Cap 18 also has a height less than the distance between the catalyst support 14 and plate 16 and preferably from about ½ to about ⅓ that distance. Cap 18 includes a plurality of angular slots 20 to impart a swirling motion to fluid passing through the cap in its downward progress though vessel 10. Preferably, slots 20 are tangentially oriented. Also, as can be seen in FIG. 2, there are ten slots 20 equally spaced around the circumference of the cap 18. The number of slots 20, of course, can vary widely. Basically, the number and size of the slots will be selected to provide a predetermined pressure drop through the cap 18.

Figure 4:
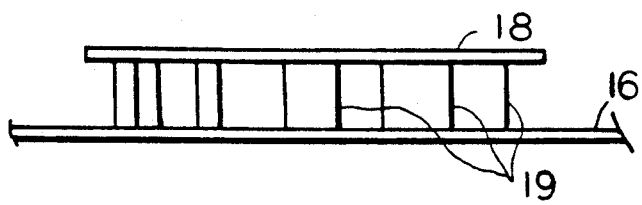
FIG. 4 is a schematic illustration of an alternate cylindrical cap which constitutes part of the interzone mixing device of this invention.
Figure 5:
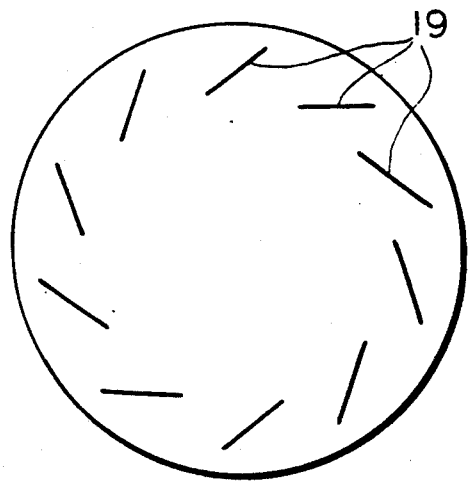
FIG. 5 is a top plan view of the arrangement of vanes of the cylindrical cap of FIG. 4.

In an alternate embodiment of the present invention, shown in FIGS. 4 and 5, the cylindrical cap 18 has a plurality of vertical vanes 19 which constitute the sidewalls extending upwardly from plate 16. As is seen in FIG. 5, these vanes 19 are oriented at an angle to the radial line, preferably from about 15° to about 75° and, most preferably, at about 45°.

In a preferred embodiment of the invention, a cylindrical pipe 17 having the same diameter as the central opening in plate 16 extends upwardly from plate 16 for a distance less than the height of cap 18 and generally from about ½ to about ¾ the height of cap 18.

Referring again to FIG. 1, as shown, slots 20 in cap 18 have a height that is about ⅓ the height of the cap; however, this dimension is not critical. Preferably, however, the slots 20 in cap 18 will have a height no greater than the height of cylindrical pipe 17.

Located below plate 16 but spaced apart from it is a horizontally disposed plate 21 which has a plurality of openings 22 arranged in an annular ring around the periphery of plate 21. Vertically downwardly from plate 21 and communicating with openings 22 are a plurality of conduits 23. In other words, for each of the openings 22, there is a conduit 23 that extends downwardly from plate 21 and communicates with the opening 22. Conduits 23 have openings or slots 24 through which fluids flow. These slots 24 may be opened inwardly so that the fluids will be directed radially into the vessel 10; however, it is particularly preferred in the practice of the present invention that the slots 24 be oriented at an angle with respect to the radial lines so that the fluids emanating from conduits 23 are projected in a swirling direction. Slots 24 may be oriented at an angle of from 0° to 90° and preferably from about 15° to about 75° to the radial line. Indeed, a 45° orientation is most preferred.

Figure 3:
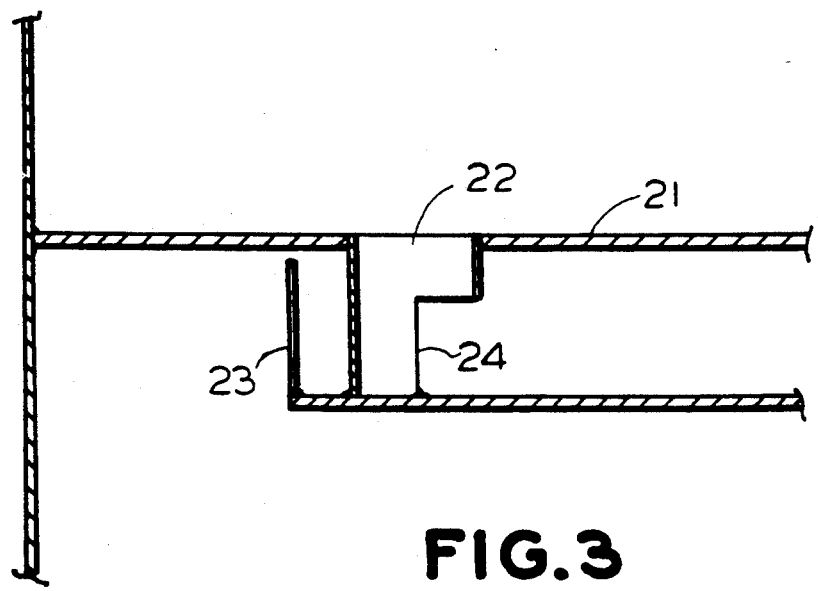
FIG. 3 is a detailed view of the slotted conduit opening into the jet stirred mixing zone of the device of the present invention.
Figure 6:
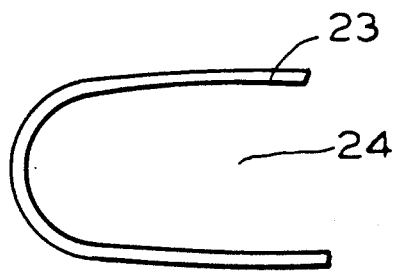
FIG. 6 is a top plan view of an alternate slotted conduit opening into the jet stirred mixing zone of the present invention.

Conduits 23, as shown in FIGS. 1 and 3, are generally cylindrical pipe sections with slots 24 cut out. Alternatively, conduits 23 may be a generally U-shaped member such as is shown in FIG. 6. In this form, the U-shaped member extends from plate 21 to plate 25 and has the opening 24 of the U angularly oriented in the same manner as slot 24 of the conduit 23 of FIGS. 1 and 2.

As can be seen in FIG. 1, located below horizontal plate 21 is a horizontally oriented plate 25 which has a vertically extended annular ring or arm portion 26 which spaces plate 25 from horizontal plate 21. Also, plate 25 has a large central opening in it. This opening, in general, will be in the range of from about 25% to about 75% and preferably from about 50% of the total cross-sectional area of the reactor.

Centrally located on and extending upwardly from plate 21 is a cylindrical table 37. Cylindrical table 37 has a diameter at least equal to the diameter of the central opening in plate 16. Thus, table 37 is located on the plate 21 so that it is below the central opening in horizontal plate 16. Table 37 extends upwardly for a distance of about ½ to about ⅓ the spacing of plate 21 and plate 16.

In the preferred embodiment of the present invention, the improved interzone mixing device includes a fluid distribution plate 28 which is horizontally disposed in vessel 10 and spaced apart from horizontal plate 25. As can be seen in FIG. 1, plate 28 contains a plurality of openings 29 from which there are upwardly extending conduits 30 provided with standard bubble caps 31 for controlling the flow of fluid through the distributor plate 28.

A pipe or conduit 32 for introducing a secondary fluid from a source (not shown) external the vessel 10 is located between the cap 18 and the catalyst support 14. Pipe 32 terminates in a centrally positioned ring sparger 32S that has a plurality of openings 33 through which secondary fluid is fed transverse to the generally downward flow of the process stream fluid.

As will be readily appreciated, the device of the present invention is equally suitable for use in upflow reactor vessels. This arrangement is shown schematically in FIG. 7. In this embodiment, the various members of the interzone mixing device share substantially the same function and the same relationship to each other as in the downflow reactor vessel and, hence, the various components will be described briefly. Complete details concerning these members can be determined from a review of the description of the downflow reactor.

Figure 7:
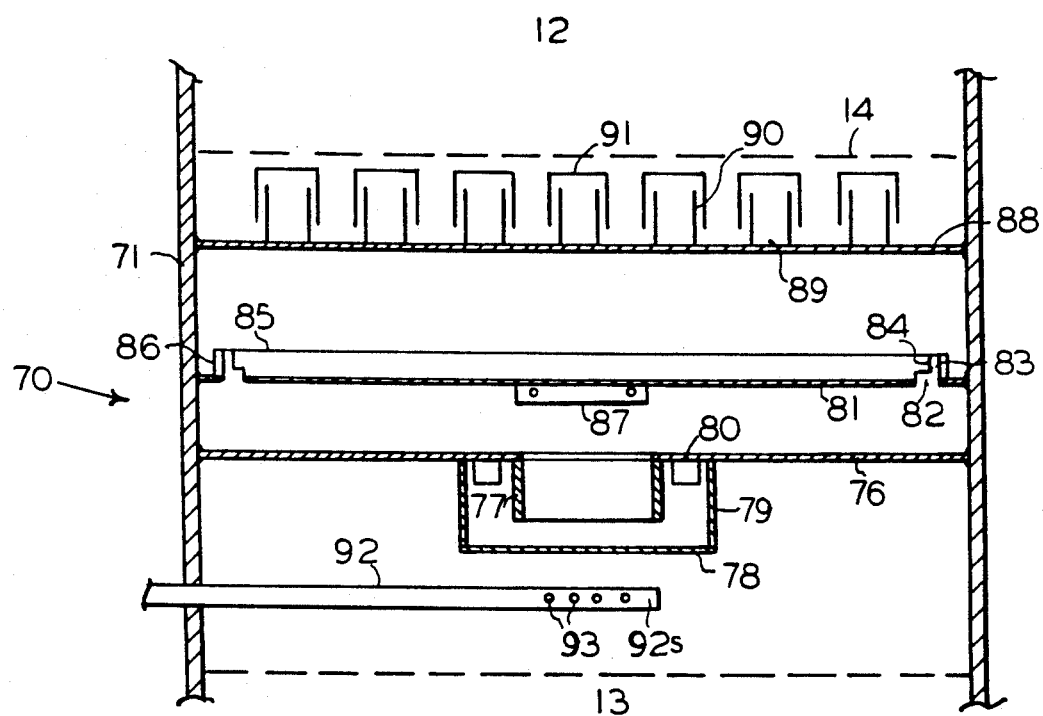
FIG. 7 is a vertical sectional view of an upflow vessel containing at least two catalyst beds and an interzone mixing device of the present invention.

Turning now to FIG. 7, reference number 70 generally indicates a fluid upflow, multi-bed catalytic reactor or vessel having a vertical cylindrical sidewall 71 enclosing a plurality of beds of catalyst. The vessel 70, therefore, has an upper fluid outlet (not shown) and a lower fluid inlet (also not shown) for introducing a fluid stream for upflow through the vessel and ultimate removal of the stream after its passage through the vessel.

Shown in FIG. 7 are catalyst beds 12 and 13. The bed 12 of the catalyst is supported by a catalyst bed support 14.

Interposed between successive catalyst beds 12 and 13 is a mixing device for introducing and mixing a secondary fluid, such as a quench fluid.

As shown in FIG. 7, the mixing device includes a horizontally disposed first plate 76 that has a central opening through which the fluids may flow as they progress through the vessel 70. Also, plate 16 is located above and spaced apart from the catalyst bed 13.

A cylindrical cap 78 with sidewalls 79 extends vertically downwardly from first plate 76 and is positioned to cover the central opening in plate 76. Cap 78 includes a plurality of angular slots 80 to impart a swirling motion to fluid passing through the cap in its upward progress through vessel 70.

In a preferred embodiment of the invention, a cylindrical pipe 77 having the same diameter as the central opening in plate 76 extends downwardly from plate 76.

Located above plate 76 but spaced apart from it is a horizontally disposed plate 81 which has a plurality of openings 82 arranged in an annular ring around the periphery of plate 81. Vertically upwardly from plate 81 and communicating with openings 82 are a plurality of conduits 83. Conduits 83 have openings or slots 84 through which fluids flow.

Located above horizontal plate 81 is a horizontally oriented plate 85 which has a vertically extended annular ring or arm portion 86 which spaces plate 85 from horizontal plate 81. Also, plate 85 has a large central opening in it.

Centrally located on and extending downwardly from plate 81 is a cylindrical table 87.

In the preferred embodiment of the present invention, the improved interzone mixing device includes a fluid distribution plate 88 which is horizontally disposed in vessel 70 and spaced apart from horizontal plate 85. As can be seen in FIG. 7, plate 88 contains a plurality of openings 89 from which there are upwardly extending conduits 90 provided with standard bubble caps 91 for controlling the flow of fluid through the distributor plate 88.

A pipe or conduit 92 for introducing a secondary fluid from a source (not shown) external the vessel 70 is located between the cap 78 and the catalyst bed 13. Pipe 92 terminates in a centrally positioned sparger 92S that has a plurality of openings 93 through which secondary fluid is fed transverse to the generally downward flow of the process stream fluid.

Obviously, the precise dimensions of the various zones, openings, conduits and the like in the interzone mixing device of the present invention will depend upon various factors such as permissible pressure drop, the space between the beds available for the mixing device and the like.

The operation of the interzone mixing device will now be described in connection with a process stream of fluid exiting from catalyst bed 14 and flowing downwardly through vessel 10. This process stream is premixed with quench fluid introduced into the vessel via sparger 32S. The quench fluid and the process fluid then enter into the mixer through openings 20 and are given a swirling motion as they begin their downward flow through the central opening in plate 16. This swirling motion, of course, results in mixing of the process stream and the secondary or quench fluid. The combined quench fluid and process fluid, after passing through the opening in plate 16, then are deflected horizontally by table 37 which imparts a new torodial flowing pattern as the fluids move outwardly to the outer openings 22. The mixing action is then regenerated as the streams are sprayed out angularly through the openings 24 of pipes 23 thereby creating another swirl pattern below the horizontal deck 21. Finally, if fluids flow downwardly through the center area of the plate 25 and are distributed by the bubble cap tray distributor disposed below the horizontal plate 25.

The following examples demonstrate the significant mixing improvements achieved by the device of the present invention. In the examples, the following test procedure was employed.

Test Procedure A

For this mixing test, a stream of air was passed downwardly through the mixer and a flow of helium amounting to 1 to 5 volume percent of the total air flow passing through the mixing device in the examples which follow was injected into the outer edge of the air flow at a location just ahead of the mixing device. The mixing test device had 28 equally spaced peripheral outlets. Samples out of 8 nearly equally spaced peripheral outlets from among the 28 total outlets were analyzed for helium content using a standard calibrated thermal conductivity detector. This detector exhibits a linear response to helium content and can therefore be used to determine the helium content of the air stream reliably. The helium content was calculated from the thermal conductivity signal.

Using the individual helium content measurements, an arithmetic deviation of the helium content from the mean was calculated by averaging the absolute normalized deviation of the helium concentration from the mean. The mean deviation multiplied by 100 is taken as the percent mean arithmatic deviation (ARD). The ARD value is a measure of the mixing occurring in the device. Perfect mixing would be denoted by an ARD of 0%, i.e. all samples have the same helium content. Thus, high ARD values correspond to low helium content uniformity exiting the mixing device and poor mixing performance and low ARD values correspond to good mixing performance.

EXAMPLE 1

A device was built according to the prescriptions of the present invention with a top plate measuring 4 inches in diameter, an orifice of 3 inches in diameter with 26 vanes angled at 15° to the radial lines, the vanes measuring 0.5 inches high and 0.5 inches deep. The box below the orifice was three inches deep and it contained a cylindrical table 8 inches in diameter and 1.5 inches high, centrally located below the orifice. The box diameter was 26 inches and at the outer periphery were located 28 equally spaced outlets, 0.375 inches in diameter. The air flow rate was 181 SCFM and the helium flow rate 1.83 SCFM (standard cubic feet per minute). Using the test procedure outline above, the ARD for a 15° vane mixer was 42%.

EXAMPLE 2

The vane mixing device of Example 1 was modified to have the vanes at an angle of 30° to the radial line with all other dimensions kept the same. Also, the gas flow rates were the same. The ARD was determined to be 22% showing an improvement due to the steeper angle of the vanes.

EXAMPLE 3

The vane mixing device of Example 2 was modified to have the vanes at an angle of 45° to the radial line with all dimensions kept the same. The air flow rate in this instance was 180 SCFM; the helium flow rate was 1.83 SCFM. The ARD was determined to be 9% showing an improvement due to the steeper angle of the vanes in comparison to the device of Examples 1 and 2.

EXAMPLE 4

The device of Example 1 in which the top plate is 6 inches in diameter, the central hole 5 inches in diameter, 35 vanes at 15° to the radial 0.5 inches high by 0.5 inches deep with the spacer 0.75 inches high and 5 inches in diameter and the mixing box 1.5 inches high by 26 inches in diameter. The helium tracer was introduced through a straight pipe sparger placed above the mixing device. The sparger had 24 holes 0.16 inches in diameter. The test consisted of mixing 660 cubic feet per minute air with 6.8 cubic feet per minute of helium. The ARD was determined to be 23%.

It should be readily appreciated that the present invention is, of course, suitable for use in various catalytic processes in which reactants or partially reacted reactants and quench fluids are to be homogeneously mixed so as to control the temperature profile of such materials, their composition or both. Indeed, the fluids may be all gases or gases or liquids, depending upon the nature of the process being carried out in the vessel. Accordingly, it will be readily appreciated that there are many variations in the construction of an interzone mixing zone device in accordance with the present invention and that the present invention should be limited solely by the scope of appended claims.

What is claimed is:

1. An interzone mixing device for mixing a secondary fluid with a main process stream fluid in a vertical vessel, comprising:
   a horizontally disposed first plate having a first surface, a second surface and a central opening therein;
   a cylindrical cap having a side wall extending vertically from the first surface of the first plate, the cap sized and positioned to cover the central opening in the first plate, the cap having a plurality of angular openings in the side wall to direct the flow of fluid in a swirling direction toward the central opening in the first plate;
   a horizontally disposed second plate having a first surface and a second surface, the second plate being spaced apart from the second surface of the first plate, the second plate having a plurality of openings in an annular ring around the periphery thereof;
   a horizontally disposed table positioned on the first surface of the second plate and axially aligned with the central opening in the first plate;
   a plurality of conduits extending vertically from the second surface of the second plate and communicating with the peripheral openings therein, the conduits having slots therein oriented at a predetermined angle with respect to the radius of the vessel;
   a horizontally disposed third plate having a first surface and a second surface, the first surface of the third plate spaced apart from the second surface of the second plate, the third plate having a central opening therein;
   a horizontally disposed fluid distribution plate spaced apart from the second surface of the third plate and having a plurality of openings therein; and,
   means for introducing a secondary fluid on the first surface of the first plate.

2. The device of claim 1 wherein the table on the second plate is cylindrical and has a diameter at least equal to the diameter of the central opening in the first plate.

3. The device of claim 2 wherein the plurality of angular openings in the side wall of the cap are equally spaced and tangentially oriented.

4. The device of claim 2 wherein the sidewall of the cylindrical cap consists of a plurality of vertical vanes tangentially oriented.

5. The device of claim 3 or 4 including a cylindrical pipe having a diameter the same as the central opening in the first plate and extending vertically from the first plate for a distance less than the height of the cap.

6. The device of claim 5 wherein the slots in the conduits are oriented at an angle of from about 0° to about 90° with respect to the radius of the vessel.

7. The device of claim 6 wherein the means for introducing secondary fluid is a conduit terminating in a centrally positioned cylindrical sparger pipe having a plurality of openings for introducing secondary fluid radially outwardly.

* * * * *